(12) United States Patent
Yu et al.

(10) Patent No.: US 9,041,876 B2
(45) Date of Patent: May 26, 2015

(54) BACK PLATE COMPONENT HAVING REFLECTIVE SHEET REINFORCING STRUCTURE AND LIQUID CRYSTAL DISPLAY DEVICE INCLUDING THE SAME

(71) Applicant: SHENZHEN CHINA STAR OPTOELECTRONICS TECHNOLOGY CO., LTD., Shenzhen, Guangdong (CN)

(72) Inventors: Ya-Jun Yu, Guangdong (CN); Yuchun Hsiao, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 191 days.

(21) Appl. No.: 13/812,060

(22) PCT Filed: Oct. 25, 2012

(86) PCT No.: PCT/CN2012/083506
§ 371 (c)(1),
(2) Date: Jan. 24, 2013

(87) PCT Pub. No.: WO2014/026434
PCT Pub. Date: Feb. 20, 2014

(65) Prior Publication Data
US 2014/0049719 A1    Feb. 20, 2014

(30) Foreign Application Priority Data

Aug. 17, 2012 (CN) .......................... 2012 1 0295715

(51) Int. Cl.
*G02F 1/1333* (2006.01)
*G02B 7/182* (2006.01)
*G02F 1/1335* (2006.01)

(52) U.S. Cl.
CPC .............. *G02B 7/182* (2013.01); *G02F 1/1333* (2013.01); *G02F 1/133553* (2013.01); *G02F 2001/133328* (2013.01); *G02F 1/133308* (2013.01);
CPC . *G02F2001/133314* (2013.01); *G02F 2201/54* (2013.01); *G02F 2203/02* (2013.01)

(58) Field of Classification Search
CPC .......................................... G02F 2001/133328
See application file for complete search history.

(56) References Cited

U.S. PATENT DOCUMENTS

2011/0043721 A1* 2/2011 Hwang et al. ................... 349/58

FOREIGN PATENT DOCUMENTS

| CN | 101281319 A | 10/2008 |
| CN | 201757332 U | 3/2011 |
| CN | 201804128 U | 4/2011 |
| CN | 102402051 A | 4/2012 |
| KR | 2012-0031799 A | 4/2012 |

* cited by examiner

*Primary Examiner* — Wen-Ying P Chen
(74) *Attorney, Agent, or Firm* — Muncy, Geissler, Olds & Lowe P.C.

(57) ABSTRACT

Provided is a back plate component having reflective sheet reinforcing structure. The back plate component includes: a frame, a reflective sheet and a plurality of supporting film sheets. The frame includes a plurality of lateral beams and vertical beams, and at least one hollow part is included between the lateral beams and the vertical beams. The reflective sheet is attached to the frame, and includes a reflective surface and a back surface corresponding to the reflective surface. A portion of the back surface covers the whole hollow part. The plurality of supporting film sheets is attached to the back surface at a region corresponding to the hollow part, and includes a material the same as that of the reflective sheet. A liquid crystal display device is further disclosed herein.

9 Claims, 5 Drawing Sheets

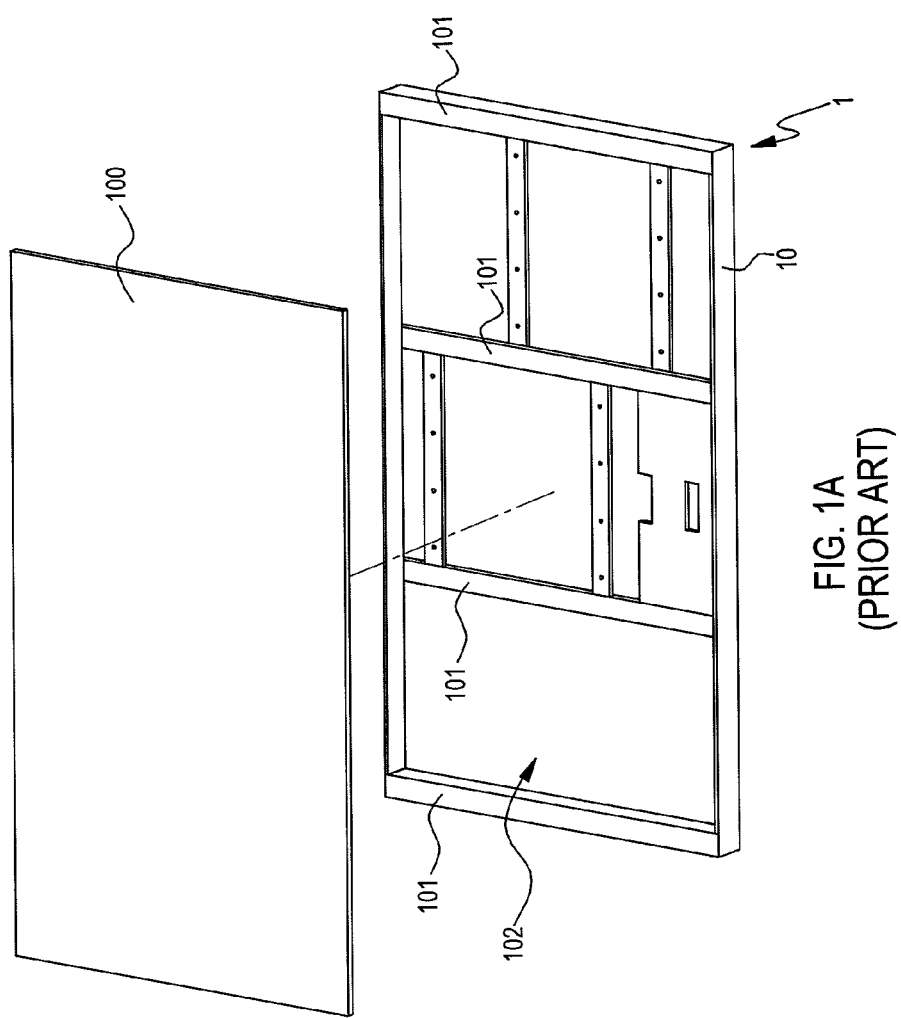

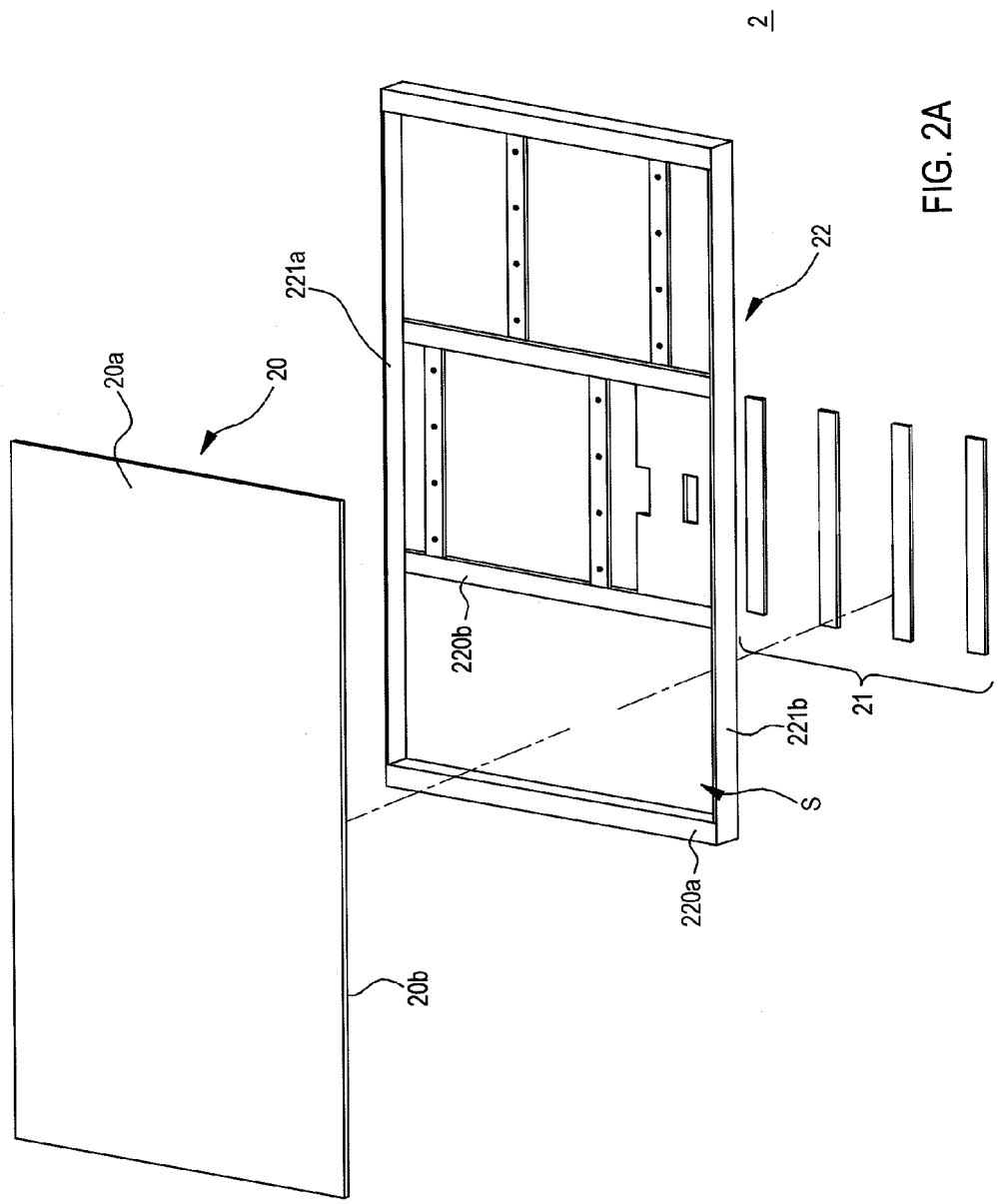

BACK PLATE COMPONENT HAVING REFLECTIVE SHEET REINFORCING STRUCTURE AND LIQUID CRYSTAL DISPLAY DEVICE INCLUDING THE SAME

BACKGROUND

1. Field of the Invention

The present invention relates to a back plate component and a liquid crystal display device, and more particularly to a back plate component having reflective sheet reinforcing structure and a liquid crystal display device including the same.

2. Related Art

In products with hollowed-out back plate, in order to reduce the amount of mold and material used during the manufacturing process, larger hollow region may exist. Therefore, a waving phenomenon is very likely to occur while performing reliability test.

Please refer to FIGS. 1A and 1B. FIG. 1A is an exploded view illustrating a existing conventional back plate component having reflective sheet reinforcing structure; FIG. 1B is an assembled view of the conventional back plate component having reflective sheet reinforcing structure according to FIG. 1A.

As shown in FIGS. 1A and 1B, a frame 10 of a back plate component 1 is disposed of a plurality of supporting beams 101 for supporting a reflective sheet 100. Wherein, in order to reduce the amount of mold and material used, a hollow region 102 with larger area may be included between the supporting beams 101 of the frame 10. In this case, when the reflective sheet 100 is positioned at the frame 10 to allow performance of the reliability test, the reflective sheet 100 is easily deformed toward outside through the hollow region 102 during environmental testing.

Specifically, during environmental testing, since the product is placed in either a low-temperature (cold) environment or a high-temperature environment (hot), when the reflective sheet 100 is positioned at the frame 10 to perform environmental test, a waving phenomenon is easily occurred at the reflective sheet 100 through the hollow region 102, as shown in FIG. 1B. In other words, because there is no support structure disposed at the reflective sheet 100 or the hollow region 102, it is very likely that, under environmental temperature changes, waving phenomenon may occur at the reflective sheet 100 through the hollow region 102, thereby affecting the optical appearance of backlight products such as backlight module.

SUMMARY

Hence, in order to solve the foregoing problem of the waving phenomenon occurred at the reflective sheet, which makes the reflective sheet to protrude out of the hollow part of the frame, caused by the environmental temperature change, thereby, the present invention provides a back plate component having reflective sheet reinforcing structure.

With the above objective in mind, the present invention provides a back plate component having reflective sheet reinforcing structure. The back plate component includes: a frame, a reflective sheet and a plurality of supporting film sheets. The frame includes a plurality of lateral beams and vertical beams, wherein at least one hollow part is included between the lateral beams and the vertical beams. The reflective sheet is attached to the frame, and includes a reflective surface and a back surface corresponding to the reflective surface; wherein, a portion of the back surface covers the whole hollow part. The plurality of supporting film sheets is attached to the back surface at a region corresponding to the hollow part, wherein the plurality of supporting film sheets includes a material the same as that of the reflective sheet.

In one embodiment, a region on the back surface that is corresponding to the hollow part has a long side and a short side; wherein, the plurality of supporting film sheets is arranged to have a same direction as the short side, and the supporting film sheets are parallel to and spaced apart with each other. The plurality of supporting film sheets is disposed at partial regions of the hollow part.

In one embodiment, a cutting direction and an attaching direction of the plurality of supporting film sheets is the same as that of the reflective sheet.

In one embodiment, the frame is a modular combined frame structure, and comprises a plurality of hollow regions; the hollow part is a hollow region having the largest hollow area among all the other hollow regions.

With the above objective in mind, the present invention further provides a liquid crystal device, wherein the liquid crystal device comprises a back plate component and a liquid crystal panel. The back plate comprises a frame, a reflective sheet, and a plurality of supporting film sheets. The frame comprises a plurality of lateral beams and vertical beams, wherein at least one hollow part is included between the lateral beams and the vertical beams. The reflective sheet is attached to the frame and comprises a reflective surface and a back surface corresponding to the reflective surface, wherein a portion of the back surface covers the whole hollow part. The a plurality of supporting film sheets is attached to the back surface at a region corresponding to the hollow part, and comprises a material the same as that of the reflective sheet. The liquid crystal panel is disposed on the back plate component.

In one embodiment, the region on the back surface that is corresponding to the hollow part has a long side and a short side; the plurality of supporting film sheets is arranged to have a same direction as the short side, and the supporting film sheets are parallel to and spaced apart with each other. The plurality of supporting film sheets is disposed at partial regions of the hollow part.

In one embodiment, a cutting direction and an attaching direction of the plurality of supporting film sheets is the same as that of the reflective sheet.

In one embodiment, the frame is a modular combined frame structure, and comprises a plurality of hollow regions; the hollow part is a hollow region having the largest hollow area among all the other hollow regions.

Comparing to prior arts, the back plate component having reflective sheet reinforcing structure and the liquid crystal display device provided by the present invention is capable of preventing waving phenomenon occurred at the reflective sheet, which makes the reflective sheet to protrude out of the hollow part of the frame, caused by the environmental temperature change.

BRIEF DESCRIPTION OF THE DRAWINGS

FIG. 1A is an exploded view illustrating a conventional back plate component having reflective sheet reinforcing structure;

FIG. 2A is an exploded view illustrating a back plate component having reflective sheet reinforcing structure according to an embodiment of the present invention;

DETAILED DESCRIPTION

Now, the preferred embodiment of the present invention will be described in detail with reference to the accompanying drawings.

Figure 1B:
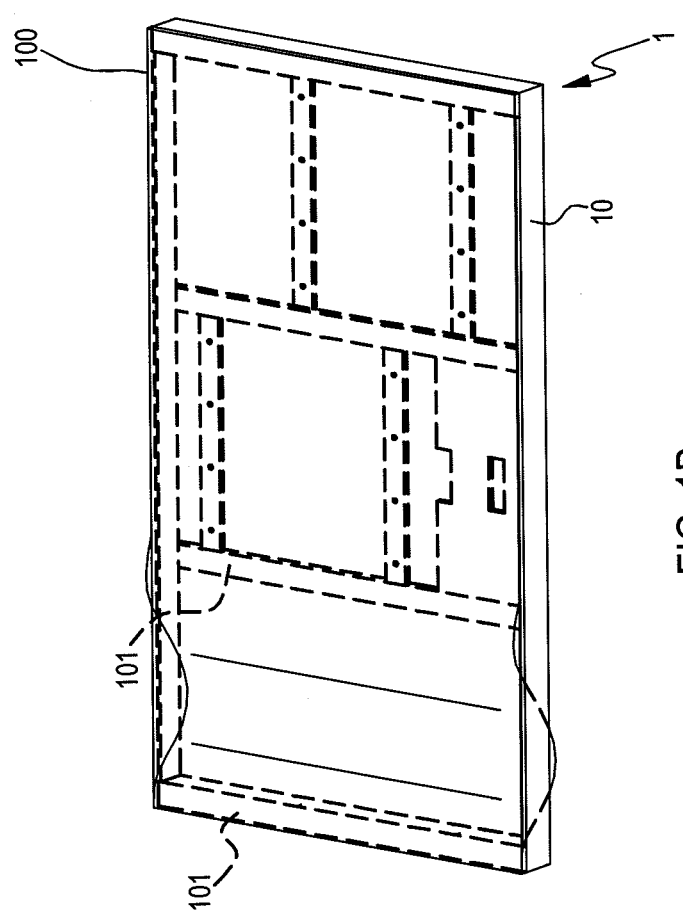
FIG. 1B is an assembled view of the conventional back plate component having reflective sheet reinforcing structure according to FIG. 1A.
Figure 2B:
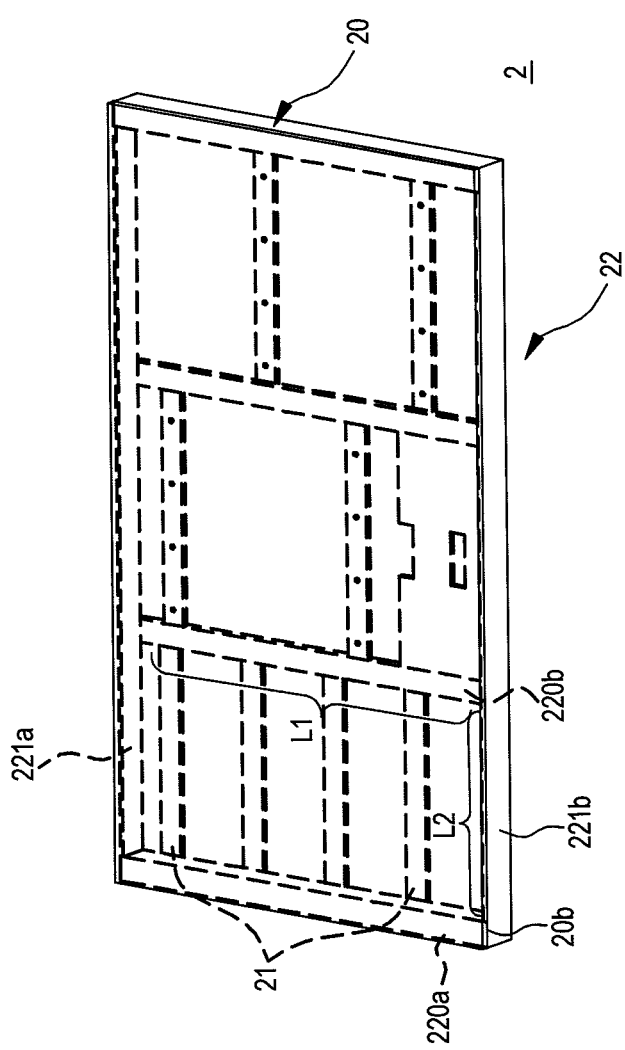
FIG. 2B is an assembled view of the back plate component having reflective sheet reinforcing structure according to FIG. 2A.

Please refer to FIGS. 2A and 2B. FIG. 2A is an exploded view illustrating a back plate component having reflective sheet reinforcing structure according to an embodiment of the present invention; and FIG. 2B is an assembled view of the back plate component having reflective sheet reinforcing structure according to FIG. 2A.

As shown in FIGS. 2A and 2B, a back plate component 2 having reflective sheet reinforcing structure (hereinafter referred to as the back plate component 2) may be employed in products with hollowed-out back plate. The back plate component 2 includes: a reflective sheet 20, a plurality of supporting film sheets 21, and a frame 22.

The frame 22 is a modular combined frame structure, and includes a plurality of lateral beams and vertical beams. The frame 22 includes a plurality of hollow regions. For example, the frame 22 includes a first lateral beam 221a, a second lateral beam 221b, a first vertical beam 220a, and a second vertical beam 220b; however, it is not limited thereto. At least one hollow part S is included between the lateral beams and vertical beams. For example, the hollow part S is the hollow region having the largest hollow area among all the other hollow regions.

The reflective sheet 20 is attached to the frame 22, and includes a reflective surface 20a and a back surface 20b corresponding to the reflective surface 20a; wherein, a portion of the back surface 20b covers the whole hollow part S.

The actual number of the plurality of supporting film sheets 21 may be determined according to actual need, and is not limited to the number illustrated in the drawings. The plurality of supporting film sheets 21 is attached to the back surface 20b of the reflective sheet 20 at a region corresponding to the hollow part S, wherein the plurality of supporting film sheets 21 includes a material the same as that of the reflective sheet 20. Preferably, the cutting direction and the attaching direction of the plurality of supporting film sheets 21 is the same as that of the reflective sheet 20.

Besides, the region corresponding to the hollow part S on the back surface 20b of the reflective sheet 20 has a long side L1 and a short side L2; wherein, the plurality of supporting film sheets 21 is arranged to have a same direction as the short side L2, and the supporting film sheets 21 are parallel to and spaced apart with each other, and are disposed at partial regions of the hollow part S.

Thus, when the reflective sheet 20 is fixed to the frame 22, a portion of the reflective sheet 20 that corresponds to the hollow part S may be reinforced by using the plurality of supporting film sheets 21 that corresponds to the hollow part S and is disposed at the back surface 20b of the reflective sheet 20.

Further, since the material used in the supporting film sheets 21 and the reflective sheet 20 are the same, they have same expansion reaction toward environmental temperature changes. Plus, since the cutting direction and the attaching direction of the plurality of supporting film sheets 21 is the same as that of the reflective sheet 20, they have same expansion reaction toward environmental temperature changes. This may prevent the occurrence of waving phenomenon at the reflective sheet 20 that makes the reflective sheet 20 to protrude out of the hollow part S.

Figure 3:
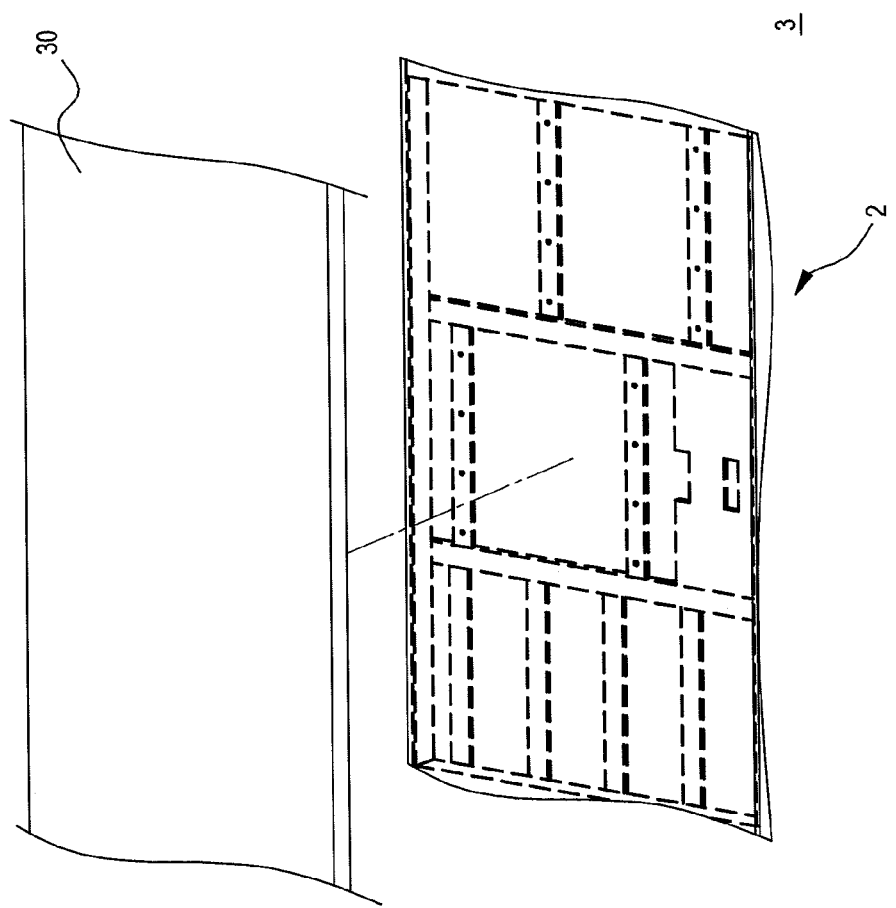
FIG. 3 is a view showing the liquid crystal display device according to an embodiment of the present invention.

Please refer to FIG. 3. FIG. 3 is a view showing the liquid crystal display device according to an embodiment of the present invention.

As shown in FIG. 3, a liquid crystal panel 30 may be disposed on the back plate component 2 to form a liquid crystal display device 3. For example, the liquid crystal display device 3 includes a backlight module (not shown) and the liquid crystal panel 30 disposed on the backlight module. The backlight module includes the back plate component 2, a backlight light source, an optical film sheet, and the like. This part is well known to those skilled in the art, and hence the detailed description thereof will be omitted herein.

The previous description of the preferred embodiment is provided to further describe the present invention, not intended to limit the present invention. Any modification according to the disclosure within the scope will be construed as being included in the present invention.

What is claimed is:

1. A back plate component having reflective sheet reinforcing structure, comprising:
   a frame, comprising a plurality of lateral beams and vertical beams, wherein at least one hollow part is included between the lateral beams and the vertical beams, the frame is a modular combined frame structure, and comprises a plurality of hollow regions; the hollow part is a hollow region having the largest hollow area among all the other hollow regions;
   a reflective sheet, attached to the frame and comprises a reflective surface and a back surface corresponding to the reflective surface, wherein a portion of the back surface covers the whole hollow part; and
   a plurality of supporting film sheets, attached to the back surface at a region corresponding to the hollow part, and comprises a material the same as that of the reflective sheet;
   wherein a region on the back surface that is corresponding to the hollow part has a long side and a short side, the plurality of supporting film sheets is arranged to have a same direction as the short side, the supporting film sheets are parallel to and spaced apart with each other, and a cutting direction and an attaching direction of the plurality of supporting film sheets is the same as that of the reflective sheet.

2. A back plate component having reflective sheet reinforcing structure, comprising:
   a frame, comprising a plurality of lateral beams and vertical beams, wherein at least one hollow part is included between the lateral beams and the vertical beams;
   a reflective sheet, attached to the frame and comprises a reflective surface and a back surface corresponding to the reflective surface, wherein a portion of the back surface covers the whole hollow part; and
   a plurality of supporting film sheets, attached to the back surface at a region corresponding to the hollow part, and comprising a material the same as that of the reflective sheet,
   wherein a cutting direction and an attaching direction of the plurality of film sheets is the same as that of the reflective sheet.

3. The back plate component having reflective sheet reinforcing structure according to claim 2, wherein the region on the back surface that is corresponding to the hollow part has a long side and a short side; the plurality of supporting film sheets is arranged to have a same direction as the short side, and the supporting film sheets are parallel to and spaced apart with each other.

4. The back plate component having reflective sheet reinforcing structure according to claim 3, wherein the plurality of supporting film sheets is disposed at partial regions of the hollow part.

5. The back plate component having reflective sheet reinforcing structure according to claim 2, wherein the frame is a modular combined frame structure, and comprises a plurality of hollow regions; the hollow part is a hollow region having the largest hollow area among all the other hollow regions.

6. A liquid crystal display device, comprising:

a back plate component, comprising a frame, comprising a plurality of lateral beams and vertical beams, wherein at least one hollow part is included between the lateral beams and the vertical beams;

a reflective sheet, attached to the frame and comprises a reflective surface and a back surface corresponding to the reflective surface, wherein a portion of the back surface covers the whole hollow part; and a plurality of supporting film sheets, attached to the back surface at a region corresponding to the hollow part, and comprises a material the same as that of the reflective sheet; and a liquid crystal panel, disposed on the back plate component, wherein a cutting direction and an attaching direction of the plurality of supporting film sheets is the same as that of the reflective sheet.

7. The liquid crystal display device according to claim 6, wherein the region on the back surface that is corresponding to the hollow part has a long side and a short side; the plurality of supporting film sheets is arranged to have a same direction as the short side, and the supporting film sheets are parallel to and spaced apart with each other.

8. The liquid crystal display device according to claim 7, wherein the plurality of supporting film sheets is disposed at partial regions of the hollow part.

9. The liquid crystal display device according to claim 6, wherein the frame is a modular combined frame structure, and comprises a plurality of hollow regions; the hollow part is a hollow region having the largest hollow area among all the other hollow regions.

* * * * *